(12) United States Patent
Ishida et al.

(10) Patent No.: US 9,059,463 B2
(45) Date of Patent: Jun. 16, 2015

(54) POSITIVE ELECTRODE FOR RECHARGEABLE LITHIUM BATTERY AND RECHARGEABLE LITHIUM BATTERY INCLUDING SAME

(75) Inventors: Sumihito Ishida, Yongin-si (KR);
Jung-Woo An, Yongin-si (KR);
Kyeu-Yoon Sheem, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 709 days.

(21) Appl. No.: 13/083,123

(22) Filed: Apr. 8, 2011

(65) Prior Publication Data
US 2012/0107687 A1    May 3, 2012

(30) Foreign Application Priority Data
Nov. 3, 2010    (KR) .......................... 10-2010-0108663

(51) Int. Cl.
| | |
|---|---|
| H01M 4/13 | (2010.01) |
| H01M 4/60 | (2006.01) |
| H01M 4/485 | (2010.01) |
| H01M 4/131 | (2010.01) |
| H01M 4/62 | (2006.01) |
| H01M 10/0525 | (2010.01) |

(52) U.S. Cl.
CPC .............. *H01M 4/485* (2013.01); *H01M 4/131* (2013.01); *H01M 4/621* (2013.01); *H01M 10/0525* (2013.01); *Y02E 60/122* (2013.01)

(58) Field of Classification Search
USPC ............................ 429/231.5, 217, 212, 218.1
See application file for complete search history.

(56) References Cited

U.S. PATENT DOCUMENTS

| | | | | |
|---|---|---|---|---|
| 5,316,875 A | * | 5/1994 | Murai et al. | ................... 429/337 |
| 5,366,830 A | * | 11/1994 | Koksbang | ................... 429/231.2 |
| 5,789,110 A | * | 8/1998 | Saidi et al. | ................... 429/218.1 |
| 6,617,077 B1 | * | 9/2003 | Ichihashi et al. | ............... 429/309 |
| 7,521,151 B2 | | 4/2009 | Hwang et al. | |

(Continued)

FOREIGN PATENT DOCUMENTS

| | | |
|---|---|---|
| JP | 63069154 | 3/1988 |
| JP | 3132671 B | 11/2000 |
| JP | 2005-510017 A | 4/2005 |
| JP | 2008547156 A | 12/2008 |
| KR | 100125148 B1 | 10/1997 |

(Continued)

OTHER PUBLICATIONS

Korean Office Action issued May 30, 2012 in connection with Korean Patent Application Serial No. 10-2010-0108663 and Request for Entry of the Accompanying Office Action attached herewith.

(Continued)

*Primary Examiner* — Helen O Conley
(74) *Attorney, Agent, or Firm* — Robert E. Bushnell, Esq.

(57) ABSTRACT

Disclosed is a positive electrode for a rechargeable lithium battery and a rechargeable lithium battery including the same. The positive electrode includes a current collector; and a positive active material layer disposed on the current collector and including a lithium vanadium oxide-based positive active material represented by the following Chemical Formula 1.

$$Li_xV_{2-y}M_yO_5 \quad \text{[Chemical Formula 1]}$$

In Chemical Formula 1,
M is one or more selected from the group consisting of aluminum (Al), magnesium (Mg), zirconium (Zr), titanium (Ti), strontium (Sr), copper (Cu), cobalt (Co), nickel (Ni), manganese (Mn), and a combination thereof,
$1<x<4$, and
$0 \leq y \leq 0.5$.

15 Claims, 1 Drawing Sheet

(56) References Cited

U.S. PATENT DOCUMENTS

| | | |
|---|---|---|
| 7,674,557 B2 | 3/2010 | Sun et al. |
| 2006/0102473 A1* | 5/2006 | Bito et al. .................. 204/293 |
| 2006/0257737 A1 | 11/2006 | Goh et al. |
| 2008/0070118 A1* | 3/2008 | Inagaki et al. ............ 429/231.2 |
| 2009/0068566 A1 | 3/2009 | Park et al. |
| 2010/0143800 A1 | 6/2010 | Sawada et al. |
| 2010/0178560 A1 | 7/2010 | Kim et al. |
| 2011/0001084 A1 | 1/2011 | Shiozaki et al. |

FOREIGN PATENT DOCUMENTS

| | | |
|---|---|---|
| KR | 100570677 B1 | 4/2006 |
| KR | 1020080049157 A | 6/2008 |
| KR | 1020100084073 | 7/2010 |

OTHER PUBLICATIONS

Korean Notice of Allowance dated Feb. 27, 2013 issues by KIPO which in connection with Korean Patent Application No. 10-2010-0108663 with Request for Entry of the Accompanying Office Action.

* cited by examiner

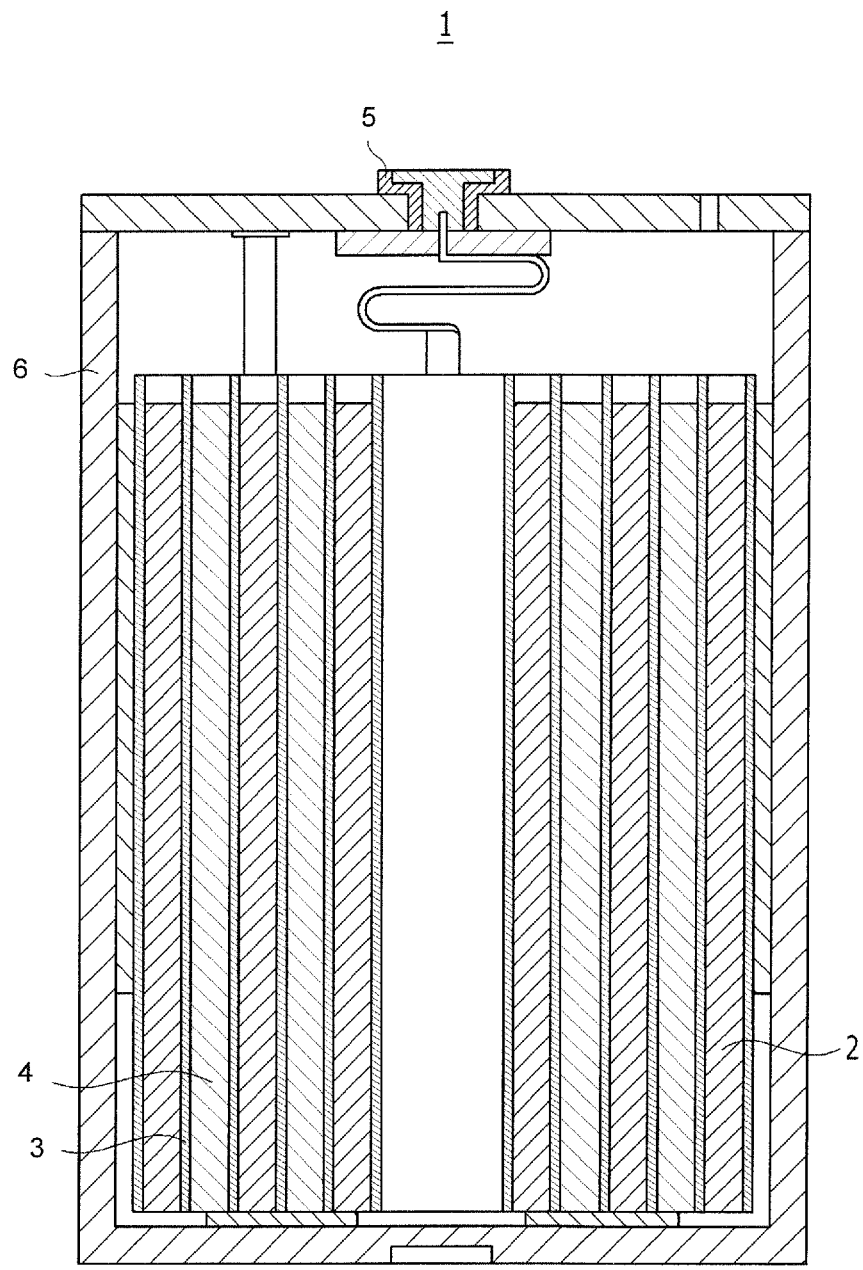

US 9,059,463 B2

POSITIVE ELECTRODE FOR RECHARGEABLE LITHIUM BATTERY AND RECHARGEABLE LITHIUM BATTERY INCLUDING SAME

CLAIM OF PRIORITY

This application makes reference to, incorporates the same herein, and claims all benefits accruing under 35 U.S.C. §119 from an application earlier filed in the Korean Intellectual Property Office on Nov. 3, 2010 and there duly assigned Serial No10-2010-0108663.

BACKGROUND OF THE INVENTION

1. Field of the Invention

An embodiment of the present invention relates to a positive electrode for a rechargeable lithium battery and a rechargeable lithium battery including the same.

2. Description of the Related Art

Lithium rechargeable batteries have recently drawn attention as a power source for small portable electronic devices. Lithium rechargeable batteries use an organic electrolyte solution, and thereby have a discharge voltage that is twice the discharge voltage of contemporary batteries which use an alkali aqueous solution. Accordingly, lithium rechargeable batteries have higher energy density in comparison with the contemporary batteries.

SUMMARY OF THE INVENTION

An embodiment of the present invention provides positive electrode for a rechargeable lithium battery, which may compensate irreversible capacity of a negative electrode and provide a rechargeable lithium battery having excellent charge and discharge efficiency and reliability.

Another embodiment of the present invention provides a rechargeable lithium battery including the positive electrode.

In accordance with one embodiment of the present invention, a positive electrode for a rechargeable lithium battery may include a current collector; and a positive active material layer disposed on the current collector and including a lithium vanadium oxide-based positive active material represented by the following Chemical Formula 1.

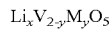  [Chemical Formula 1]

In Chemical Formula 1,

M is one or more selected from the group consisting of aluminum (Al), magnesium (Mg), zirconium (Zr), titanium (Ti), strontium (Sr), copper (Cu), cobalt (Co), nickel (Ni), manganese (Mn), and combinations thereof, 1<x<4, and 0≤y≤0.5.

The lithium vanadium oxide-based positive active material may be amorphous.

The lithium vanadium oxide-based positive active material may have a lithium oxidation potential ranging from about 1.5V to about 3.5V.

The positive active material may be at least one compound represented by the following Chemical Formulae 2 to 4:

  [Chemical Formula 2]

  [Chemical Formula 3]

  [Chemical Formula 4]

The positive electrode for a rechargeable lithium battery may further include a binder and a conductive agent.

The binder may be selected from the group consisting of polyvinylidene fluoride (PVDF), polyimide (PI), polyamide-imide (PAI), a polyimide-polyamideimide copolymer (PI-PAI), and a combination thereof.

In accordance with another embodiment of the present invention, a rechargeable lithium battery may include a negative electrode including a negative active material, the positive electrode, and a non-aqueous electrolyte.

The negative active material may be graphite.

Hereinafter, further embodiments of the present invention will be described in detail.

Therefore, a positive electrode for a rechargeable lithium battery according to one embodiment of the present invention may compensate irreversible capacity for a negative electrode and thus, provide a rechargeable lithium battery having excellent initial charge and discharge efficiency and reliability.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein:

FIG. 1 shows a cross-sectional view of the structure of a rechargeable lithium battery according to one embodiment of the present invention.

DETAILED DESCRIPTION OF THE INVENTION

Exemplary embodiments of the present invention will hereinafter be described in detail. However, these embodiments are only exemplary, and the present invention is not limited thereto.

For positive active materials forming a rechargeable lithium battery, lithium-transition element composite oxides being capable of intercalating lithium, for example, $LiCoO_2$, $LiMn_2O_4$, $LiNi_{1-x}Co_xO_2$ (0<x<1), have been researched. As for negative active materials forming a rechargeable lithium battery, various carbon-based materials such as artificial graphite, natural graphite, and hard carbon, which can all intercalate and deintercalate lithium ions, have been used.

Recently, since a battery with higher capacity is increasingly required, much research has been made on Li-rich compounds such as $Li_2MO_3$ (M=Co, Ni, Mn), $Li_2MPO_4F$, $Li_2MSiO_4$, and the like, used as a positive active material with high theoretical capacity density. Research however has not yet developed a positive active material having a complete Li reversible reaction.

On the other hand, Li is known to be included in various structures, since a valance number of V (Vanadium) in a chemical formula $V_2O_5$ continuously changes from 2 to 5. Accordingly, a battery developed includes positive active material which has $V_2O_5$ including no Li and a negative electrode formed of a metal including Li.

When the battery is repetitively charged and discharged, however, a Li metal having a needle-shape is extracted and thus, brings an internal short-circuit and deteriorates battery safety due to large specific surface area and low thermal stability of the extracted needle-shaped crystal.

Accordingly, a battery was developed by once discharging a battery including a $V_2O_5$ positive electrode and a Li negative electrode to compensate Li for the positive electrode and then, decomposing the battery and reassembling a new battery using $LiV_2O_5$ compensated by Li as a positive electrode and amorphous carbon as a negative electrode. Such battery however costs higher during the manufacturing process, and may not be applied to a battery bigger than a coin-size. In addition, the amorphous carbon has a potential changing from 1.5V to 0.01V during the charge and discharge. The $V_2O_5$ has a potential changing from 3.5V to 2.0V. Accordingly, the battery including positive and negative electrodes may have lower voltage and would be hardly employed by actual applications.

In accordance with one embodiment of the present invention, a positive electrode for a rechargeable lithium battery may include a current collector; and a positive active material layer disposed on the current collector and including a lithium vanadium oxide-based positive active material represented by the following Chemical Formula 1.

$$Li_xV_{2-y}M_yO_5 \qquad \text{[Chemical Formula 1]}$$

In Chemical Formula 1,

M is one or more selected from the group consisting of aluminum (Al), magnesium (Mg), zirconium (Zr), titanium (Ti), strontium (Sr), copper (Cu), cobalt (Co), nickel (Ni), manganese (Mn), and a combination thereof, x is in the range of $1<x<4$, in particular, $1<x\leq3.5$, and in more particular, $2\leq x\leq3.5$, and y is in the range of $0\leq y\leq0.5$ and in particular, $0.02<y\leq0.5$.

When x is 1, $LiV_2O_5$ has theoretical capacity of about 141 mAh/g. When x is 2, $Li_2V_2O_5$ has theoretical capacity of about 273 mAh/g, and when x is 3, $Li_3V_2O_5$ has theoretical capacity of about 396 mAh/g.

On the other hand, a widely-used positive active material, $LiCoO_2$, has theoretical capacity of about 273 mAh/g but actual capacity ranging from about 140 mAh/g to about 150 mAh/g, because only a half of Li works.

Accordingly, when x is greater than 1, the lithium vanadium oxide-based positive active material may have excellent capacity characteristic compared with the contemporary $LiCoO_2$ positive active material and increase energy density of a rechargeable lithium battery.

When x is greater than 4, the lithium vanadium oxide-based positive active material may have a problem of absorbing impurities.

Since the lithium vanadium oxide-based positive active material includes vanadium having an oxidation number continuously changing in a range of 2, 3, 4, and 5, it may stably maintain much lithium and generate no impurity such as lithium oxide, lithium hydroxide, lithium carbonate, and the like and thus, stably contain lithium in a $Li_xV_{2-y}M_yO_5$ structure.

In addition, even when lithium is all deintercalated, $V_2O_5$ remains stable, neither collapsing a crystal nor producing oxygen.

The lithium vanadium oxide-based positive active material has a low oxidation potential ($Li/Li^+$) and thus, increases battery capacity and does not degrade a positive electrode, thereby improving battery reliability such as cycle-life and the like.

The lithium vanadium oxide-based positive active material may be amorphous or crystalline. However, when a positive electrode according to one embodiment of the present invention is used for a rechargeable lithium battery having a low discharge cut-off voltage, for example, ranging from about 1.5V to about 2V, the lithium vanadium oxide-based positive active material may be amorphous and thus, improve battery reversibility against charge and discharge.

The lithium vanadium oxide-based positive active material, $Li_xV_2O_5$, may include a part of V doped with at least one material selected from the group consisting of aluminum (Al), magnesium (Mg), zirconium (Zr), titanium (Ti), strontium (Sr), copper (Cu), cobalt (Co), nickel (Ni), manganese (Mn), and a combination thereof. When the V is doped with the material selected, the positive active material may have less reactivity with moisture, improving stability.

When the positive active material for a rechargeable lithium battery is amorphous, the positive active material may be more effectively doped and more easily becomes amorphous and accordingly, improve cycle-life characteristics.

The lithium vanadium oxide-based positive active material may include a compound represented by the following Chemical Formulae 2 to 4 or a combination thereof.

$$Li_2V_2O_5 \qquad \text{[Chemical Formula 2]}$$

$$Li_3V_2O_5 \qquad \text{[Chemical Formula 3]}$$

$$Li_{3.5}V_2O_5 \qquad \text{[Chemical Formula 4]}$$

The positive active material layer may further include a binder and a conductive agent other than the lithium vanadium oxide-based positive active material. Herein, the lithium vanadium oxide-based positive active material may be included in an amount ranging from about 80 wt % to about 95 wt % based on the total weight of a positive active material. The binder and the conductive agent are respectively included in an amount ranging from about 2 wt % to about 10 wt % based on the total weight of a positive active material.

The binder may play a role of attaching positive active material particles and also, the positive active material to a current collector and for example, include polyvinylidene fluoride (PVdF), polyimide (PI), polyamidimide (PAI), a polyimide-polyamideimide copolymer (PI-PAI), and a combination thereof, polyvinylalcohol, carboxylmethylcellulose, hydroxypropylcellulose, diacetylcellulose, polyvinylchloride, carboxylated polyvinylchloride, polyvinylfluoride, a polymer including ethylene oxide, polyvinylpyrrolidone, polyurethane, polytetrafluoroethylene, polyvinylidene fluoride, polyethylene, polypropylene, styrene-butadiene rubber, acrylated styrene-butadiene rubber, an epoxy resin, nylon, and the like. In particular, it may include at least one selected from the group consisting of polyvinylidene fluoride (PVDF), polyimide (PI), polyamideimide (PAI), a polyimide-polyamideimide copolymer (PI-PAI), and a combination thereof, but is not limited thereto.

The conductive agent may include any agent generally used for a rechargeable lithium battery and for example, a conductive material including a carbon-based material such as natural graphite, artificial graphite, carbon black, acetylene black, ketjen black, carbon fiber, and the like; a metal-based material such as metal powder, metal fiber, or the like such as copper, nickel, aluminum, silver, and the like; a conductive polymer such as a polyphenylene derivative and the like; or a mixture thereof.

The current collector may include an Al foil but is not limited thereto.

The positive electrode may be fabricated by preparing a positive active material composition by mixing a positive active material, a binder, and a conductive agent in a solvent, coating the positive active material composition on a current collector, and drying and compressing the coated product in a common process. Examples of the solvent may include N-methylpyrrolidone and the like but are not limited thereto. This aforementioned method of manufacturing the positive electrode is well-known in a related art and will not be illustrated in detail in this specification.

According to another embodiment of the present invention, provided is a rechargeable lithium battery including a negative electrode including a negative active material, the positive electrode, and a non-aqueous electrolyte.

The negative electrode may include a negative active material layer including a negative active material and a current collector supporting such negative active material.

The negative active material may include a material that may reversibly intercalate/deintercalate lithium ions, a lithium metal, a lithium metal alloy, a material that may be doped and dedoped on lithium, or a transition metal oxide.

The material that may reversibly intercalate/deintercalate lithium ions may include any carbon material generally used in a lithium ion rechargeable battery, for example, crystalline carbon, amorphous carbon, or a combination thereof. The crystalline carbon may include at least one of shapeless graphite, sheet-type graphite, flake-type graphite, spherical-shaped graphite or fiber-shaped natural graphite, artificial graphite, and a mixture thereof. The amorphous carbon may include soft carbon, hard carbon, mesophase pitch carbonized products, fired cokes, or a mixture thereof.

In particular, when graphite is used as a negative active material, the negative electrode has no voltage change. Accordingly, graphite may be used together with the lithium vanadium oxide-based positive active material to fabricate a 3V-grade battery with high capacity.

The lithium metal alloy may be an alloy of a metal selected from the group consisting of Na, K, Rb, Cs, Fr, Be, Mg, Ca, Sr, Si, Sb, Pb, In, Zn, Ba, Ra, Ge, Al, and Sn with lithium.

The material doped and dedoped on lithium may include Si, $SiO_x$ ($0<x<2$), Si-Q alloy (the Q is an element selected from the group consisting of an alkali metal, an alkaline-earth metal, Group 13 element, Group 14 element, Group 15 element, Group 16 element, transition elements, a rare earth element, and a combination thereof but not Si), Sn, $SnO_2$, Sn—R (the R is an element selected from the group consisting of an alkali metal, an alkaline-earth metal, Group 13 element, Group 14 element, Group 15 element, Group 16 element, transition elements, a rare earth element, and a combination thereof but not Sn), and the like, and a mixture of at least one thereof with $SiO_2$. The element Q and R may be selected from the group consisting of Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, and a combination thereof.

The transition metal oxide may include vanadium oxide, lithium titanium oxide, and lithium vanadium oxide but is not limited thereto.

The negative active material layer may include a negative active material in an amount ranging from about 95 wt % to about 99 wt % based on the total weight of the negative active material.

The negative active material layer may include a binder and further optionally a conductive agent. The binder may be included in an amount ranging from about 1 wt % to about 5 wt % based on the total weight of the negative active material. In addition, when the conductive agent is further included therein, the negative active material may be in a range from about 90 wt % to about 98 wt %, the binder may be in a range from about 1 wt % to about 5 wt %, and the conductive agent may be in a range from about 1 wt % to about 5 wt %.

The binder may play a role of attaching negative active material particles and also, the negative active material to a current collector. The binder may include a non-water-soluble binder, a water-soluble binder, or a combination thereof.

The non-water-soluble binder may include polyvinylchloride, carboxylated, to polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, or a combination thereof.

The water-soluble binder may include styrene-butadiene rubber, acrylated styrene-butadiene rubber, polyvinylalcohol, polyacrylic acid sodium, copolymer of propylene with C2 to C8 olefin, a copolymer of (meth)acrylic acid with (meth)acrylic acid alkylester, or a combination thereof.

When a water-soluble binder is used as the negative electrode binder, it may further include a cellulose-based compound being able to apply viscosity. This cellulose-based compound may include a mixture of at least one selected from the group consisting of carboxylmethyl cellulose, hydroxypropylmethyl cellulose, methyl cellulose, or an alkali metal salt thereof. The alkali metal may include Na, K, or Li. This thickener may be used in an amount ranging from 0.1 parts by weight to about 3 parts by weight based on 100 parts by weight of the negative active material.

The current collector may include a copper foil, a nickel foil, a stainless steel foil, a titanium foil, a nickel foam, a copper foam, a polymer substrate coated with a conductive metal, or a combination thereof.

The conductive agent may in general include any agent used for a rechargeable lithium battery and for example, a carbon-based material such as natural graphite, artificial graphite, carbon black, acetylene black, ketjen black, a carbon fiber, and the like; a metal-based material such as a metal powder, a metal fiber, or the like such as copper, nickel, aluminum, silver, and the like; a conductive polymer such as a polyphenylene derivative and the like; or a conductive material including a mixture thereof.

The negative electrode may be fabricated by preparing a negative active material composition by mixing a negative active material, a binder, and selectively a conductive agent in a solvent, coating the negative active material composition on a current collector, and drying and compressing the coated product in a common process. Examples of the solvent may include N-methylpyrrolidone, water, or the like but are not limited thereto. This method of manufacturing the negative electrode is well-known in a related art and will not be illustrated in detail in the specification.

The non-aqueous electrolyte may include a non-aqueous organic solvent and a lithium salt.

The non-aqueous organic solvent may play a role of being a medium through which ions related to an electrochemical reaction may transfer.

The non-aqueous organic solvent may include a carbonate-based, an ester-based, an ether-based, a ketone-based, an alcohol-based, or an aprotic solvent. The carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like. The ester-based solvent may include methyl acetate, ethyl acetate, n-propyl acetate, dimethylacetate, methylpropinonate, ethylpropinonate, γ-butyrolactone, decanolide, valerolactone, mevalonolactone, caprolactone, and the like. The ether-based solvent may include dibutyl ether, tetraglyme, diglyme, dimethoxyethane, 2-methyltetrahydrofuran, tetrahydrofuran, and the like. The ketone-based solvent may include cyclohexanone and the like. In addition, the alcohol-based solvent may include ethanol, isopropyl alcohol, and the like. The aprotic solvent may include nitriles such as R—CN (herein, R is a C2 to C20 linear, branched, or cyclic hydrocarbon group and may include a double bond direction ring or an ether bond) and the like, amides such as dimethyl formamide and the like, dioxolanes such as 1,3-dioxolane and the like, sulfolanes, and the like.

The non-aqueous organic solvent may be used in a single or a mixture of more than one thereof. The mixture may be prepared in various ratios depending on a desired battery performance, which may be easily understood by those who work in a related art.

In addition, the carbonate-based solvent may include a mixture of cyclic carbonate and linear (chain) carbonate. Herein, when the cyclic carbonate and the linear carbonate may be mixed in a volume ratio ranging from about 1:1 to about 1:9, the mixed solvent brings about excellent performance of an electrolyte.

In accordance with one embodiment of the present invention, a non-aqueous organic solvent may be prepared by further adding an aromatic hydrocarbon-based organic solvent to the carbonate-based solvent. Herein, the carbonate-based solvent and the aromatic hydrocarbon-based organic solvent may be mixed in a volume ratio ranging from about 1:1 to about 30:1.

The aromatic hydrocarbon-based organic solvent may include an aromatic hydrocarbon-based compound represented by the following Chemical Formula 5.

[Chemical Formula 5]

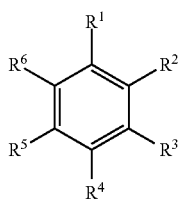

In Chemical Formula 5,
$R^1$ to $R^6$ is respectively selected from the group consisting of independently hydrogen, halogen, a C1 to C10 alkyl group, a C1 to C10 halo alkyl group, and a combination thereof.

The aromatic hydrocarbon-based organic solvent may be selected from the group consisting of benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene and a combination thereof.

The non-aqueous electrolyte may further include vinylene carbonate or an ethylene carbonate-based compound represented by the following Chemical Formula 6 to improve cycle-life of a battery.

[Chemical Formula 6]

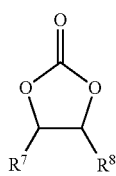

In Chemical Formula 6,
$R^7$ and $R^8$ are independently selected from the group consisting of hydrogen, a halogen group, a cyano (CN) group, a nitro ($NO_2$) group, and a C1 to C5 fluorinated alkyl group. At least either of the $R^7$ and $R^8$ may be selected from the group consisting of a halogen group, a cyano (CN) group, a nitro ($NO_2$) group, and a C1 to C5 fluorinated alkyl group, but both of the $R^7$ and $R^8$ are not hydrogen.

Examples of the ethylene carbonate-based compound may include difluoro ethylenecarbonate, chloroethylene carbonate, dichloroethylene carbonate, bromoethylene carbonate, dibromoethylene carbonate, nitroethylene carbonate, cyanoethylene carbonate, fluoroethylene carbonate, or the like. This cycle-life improving additive may be appropriately controlled in an amount.

The lithium salt is dissolved in an organic solvent and works as a source for lithium ions in a battery and thus, plays a role of basically operating a rechargeable lithium battery and promoting transportation of lithium ions between positive and negative electrodes. Examples of the lithium salt may include electrolytic salt supporting one or more than two selected from the group consisting of $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (where x and y are natural numbers), LiCl, LiI and $LiB(C_2O_4)_2$ (lithium bisoxalato borate, LiBOB). The lithium salt may have a concentration ranging from about 0.1 M to about 2.0 M. When the lithium salt has a concentration within the range, an electrolyte may have appropriate conductivity and viscosity, having excellent performance and effectively promoting transportation of lithium ions.

FIG. 1 schematically shows representative structure of a rechargeable lithium battery according to one embodiment of the present invention. As shown in FIG. 1, the rechargeable lithium battery 1 includes a negative electrode 2, a positive electrode 4, and a separator 3 disposed between the negative electrode 2 and the positive electrode 4, an electrolyte (not shown) impregnating the negative electrode 2, the positive electrode 4, and the separator 3, a battery container 6, and a sealing member 5 sealing the battery container 6.

Depending on a rechargeable lithium battery, a separator may be disposed between positive and negative electrodes. This separator may include polyethylene, polypropylene, polyvinylidene fluoride, or a multilayer thereof. The multilayer may be a mixed multilayer such as a double polyethylene/polypropylene separator, a triple polyethylene/polypropylene/polyethylene separator, a triple polypropylene/polyethylene/polypropylene separator, and the like.

The following examples illustrate the present invention in more detail. However, the following examples are exemplary, but the present invention is not limited thereto.

EXAMPLES

Example 1

Fabrication of Rechargeable Lithium Battery Cell 1.0 mol of $Li_2CO_3$ available from Sigma-Aldrich Inc. and 1.0 mol of $V_2O_5$ were weighed and they were mixed. The mixture was heated up to 750° C. in a heat-resistant and chemical-resistant crucible under air atmosphere. When the reactants were all fused, they were taken out of the crucible, preparing $Li_2V_2O_5$ with an average particle diameter of 20 μM. The $Li_2V_2O_5$ has a lithium oxidation potential of 2.7V.

95 wt % of the $Li_2V_2O_5$ active material was mixed with 2 wt % of an acetylene black conductive agent and 3 wt % of a polyvinylidene fluoride (PVDF) binder in an N-methylpyrrolidone solvent, preparing positive active material slurry.

The positive active material slurry was coated on a 15 μm-thick Al foil. Herein, the slurry was coated to be a coating weight of 0.0154 g/cm$^2$ per a cross-section on both sides and pressed up to 3.0 g/cc of density, fabricating a positive electrode.

On the other hand, 95 wt % of a natural graphite active material with an average particle diameter of 10 μm was mixed with 4 wt % of a styrene butadiene rubber binder and 1 wt % of a carboxylmethylcellulose thickener in a water solvent, preparing negative active material slurry. The negative active material slurry was coated on a 10 μm-thick Cu foil. Herein, the slurry was coated to be 0.0157 g/cm$^2$ on both sides and pressed up to 1.3 g/cc of density, fabricating a negative electrode.

The negative and negative electrodes were cut along a cross-section. Then, a 20 μm-thick polyethylene separator was inserted between the positive and negative electrodes, assembling an electrode assembly. The electrode assembly was used to fabricate a 18650-sized cylindrical battery cell.

Herein, an electrolyte was prepared by dissolving 1.3M LiPF$_6$ in a solvent of ethylene carbonate, ethylmethyl carbonate, and dimethyl carbonate mixed in a volume ratio of 3:5:2.

Initial efficiency of the fabricated battery cell was obtained by a ratio of discharge capacity to charge capacity after 5$^{th}$ cycle full charge and discharging of the initial charge and discharge. In addition, the cell was charged with a constant current (CC charge) of 0.2 C up to 4.0V and allowed to stand for minutes and then, discharged with a constant current of 0.2 C down to 2.0V and measured regarding initial capacity. Furthermore, the battery cell was 300 times repetitively charged with 1.0 C to 4.0V (CC charge) and discharged at 1.0 C to 2.0V (CC discharge) in a 45° C. thermostat and then, measured regarding discharge capacity at the 300th cycle. This discharge capacity at the 300th cycle was compared with the initial capacity to evaluate cycle-life characteristic. The results are provided in the following Table 1.

Example 2

Fabrication of Rechargeable Lithium Battery Cell

A Li$_3$V$_2$O$_5$ electrode was fabricated according to the same method as Example 1 except for using 1.5 mol of Li$_2$CO$_3$ instead of 1.0 mol of Li$_2$CO$_3$ and using the prepared slurry in a coating weight of 0.0105 g/cm$^2$. The Li$_3$V$_2$O$_5$ has a lithium oxidation potential of 2.5V. The Li$_3$V$_2$O$_5$ electrode was used to fabricate a rechargeable lithium battery cell. The results are provided in the following Table 1.

Example 3

Fabrication Rechargeable Lithium Battery Cell

A Li$_{3.5}$V$_2$O$_5$ electrode was fabricated according to the same method as Example 1 except for using 1.75 mol of Li$_2$CO$_3$ instead of 1.0 mol of Li$_2$CO$_3$ and using the prepared slurry in a coating weight of 0.0091 g/cm$^2$. The Li$_{3.5}$V$_2$O$_5$ has a lithium oxidation potential of 2.2V. The Li$_{3.5}$V$_2$O$_5$ electrode was used to fabricate a rechargeable lithium battery cell. The results are provided in the following Table 1.

Comparative Example 1

Fabrication of Rechargeable Lithium Battery Cell 0.5 mol of Li$_2$CO$_3$ (Sigma-Aldrich Inc.) and 1.0 mol of V$_2$O$_5$ were weighed and they were mixed. The mixture was heated up to 750° C. in a heat-resistant and chemical-resistant crucible under air atmosphere. When the reactants were fused, they were taken out of the crucible, preparing LiV$_2$O$_5$ with an average particle diameter of 20 μM. The LiV$_2$O$_5$ has a lithium oxidation potential of 3.2V.

95 wt % of the prepared LiV$_2$O$_5$ active material was mixed with 2 wt % of an acetylene black conductive agent and 3 wt % of a polyvinylidene fluoride binder in an N-methylpyrrolidone solvent, preparing positive active material slurry.

The positive active material slurry was coated on a 15 μm-thick Al foil. Herein, the slurry was coated to be a coating weight of 0.0285 g/cm$^2$ and pressed up to 3.0 g/cc of density, fabricating a positive electrode. Other than that, a battery cell was fabricated and then, evaluated according to the same method as Example 1. The results are provided in the following Table 1.

Comparative Example 2

Fabrication of Rechargeable Lithium Battery Cell 95 wt % of a V$_2$O$_5$ active material with an average a particle diameter of 20 μm was mixed with 2 wt % of an acetylene black conductive agent and 3 wt % of a polyvinylidene fluoride binder in an N-methylpyrrolidone solvent, preparing a positive active material slurry. The V$_2$O$_5$ has a lithium oxidation potential of 3.2V.

The positive active material slurry was coated on a 15 μm-thick Al foil. The slurry was coated to be a coating weight of 0.0270 g/cm$^2$ and pressed up to 3.0 g/cc of density, fabricating a positive electrode.

On the other hand, a 100 μm-thick Li was used as a counter electrode. Then, a 20 μm-thick polyethylene separator was inserted between the positive and negative electrodes, assembling an electrode assembly. The electrode assembly was used to fabricate a coin cell.

Herein, an electrolyte was prepared by dissolving 1.3M LiPF$_6$ in a solvent of ethylene carbonate, ethylmethyl carbonate, and dimethyl carbonate mixed in a volume ratio of 3:5:2.

The coin cell was discharged until the positive active material has a LiV$_2$O$_5$ composition. Then, the cell was decomposed to acquire a LiV$_2$O$_5$ positive electrode.

A 18650-sized cylindrical battery cell was fabricated and evaluated according to the same method as Example 1 except for using a positive electrode including LiV$_2$O$_5$ instead of Li$_2$V$_2$O$_5$ as an active material. The results are provided in the following Table 1.

TABLE 1

| | Li$_x$V$_2$O$_5$ | | | | Negative | | | 45° C., 1 C, Discharge |
|---|---|---|---|---|---|---|---|---|
| | Positive active material | x | Amount (wt %) | binder | Li formation process | electrode active material | Capacity (mAh) | Efficiency (%) | capacity retention (%) after 300 cycles |
| Example 1 | Li$_x$V$_2$O$_5$ | 2 | 95 | PVDF | no | graphite | 2521 | 93 | 76 |
| Example 2 | Li$_x$V$_2$O$_5$ | 3 | 95 | PVDF | no | graphite | 2830 | 90 | 72 |

TABLE 1-continued

|  | \underline{$Li_xV_2O_5$} | | | | Negative | | | 45° C., 1 C, Discharge |
| --- | --- | --- | --- | --- | --- | --- | --- | --- |
|  | Positive active material | x | Amount (wt %) | binder | Li formation process | electrode active material | Capacity (mAh) | Efficiency (%) | capacity retention (%) after 300 cycles |
| Example 3 | $Li_xV_2O_5$ | 3.5 | 95 | PVDF | no | graphite | 2934 | 86 | 71 |
| Comparative Example 1 | $Li_xV_2O_5$ | 1 | 95 | PVDF | no | graphite | 1987 | 79 | 55 |
| Comparative Example 2 | $V_2O_5$ | 0 | 95 | PVDF | Yes | graphite | 1975 | 75 | 43 |

As shown in Table 1, the battery cells including a positive active material including Li in an amount of more than 1 according to Examples 1 to 3 had excellent initial efficiency and high battery capacity, showing good cycle-life characteristic. The battery cells including a positive active material including Li in an amount of 1 or less according to Comparative Examples 1 and 2 however had smaller capacity and worse initial efficiency, showing deteriorated cycle-life characteristic in comparison with Examples 1 through 3.

In particular, in the Comparative Example 2, since the battery cell fabricated by charging Li at a positive electrode with electrochemical formation using a $V_2O_5$ positive active material and a Li counter electrode once has to be decomposed, $LiV_2O_5$ soaked in an electrolyte has to be left in the air for a long time. Then, the battery cell may be corroded due to HF and the like. Accordingly, when the positive electrode is reassembled with a negative electrode, the battery cell may not have excellent efficiency or cycle-life characteristic.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A positive electrode for a rechargeable lithium battery, comprising:
    a current collector; and
    a positive active material layer disposed on the current collector, the positive active material layer comprising a binder, a conductive agent and a positive active material essentially consisting of a lithium vanadium oxide-based compound represented by the following Chemical Formula 1:

$$Li_xV_{2-y}M_yO_5 \quad \text{[Chemical Formula 1]}$$

wherein M is at least one selected from the group consisting of aluminum (Al), magnesium (Mg), zirconium (Zr), titanium (Ti), strontium (Sr), copper (Cu), cobalt (Co), nickel (Ni), manganese (Mn), and a combination thereof, and
    wherein $3.5 \leq x < 4$ and y is $0 \leq y \leq 0.5$.

2. The positive electrode of claim 1, wherein the lithium vanadium oxide-based compound has a lithium oxidation potential ranging from 1.5V to 3.5V.

3. The positive electrode of claim 1, wherein the lithium vanadium oxide-based compound is represented by the following Chemical Formula 3:

$$Li_{3.5}V_2O_5 \quad \text{[Chemical Formula 3]}$$

4. The positive electrode of claim 1, wherein the binder is at least one selected from the group consisting of polyvinylidene fluoride (PVDF), polyimide (PI), polyamideimide (PAI), a polyimide-polyamideimide copolymer (PI-PAI), and a combination thereof.

5. A rechargeable lithium battery, comprising:
    a negative electrode including natural graphite as a negative active material;
    a positive electrode; and
    a non-aqueous electrolyte impregnating the negative electrode and the positive electrode,
    wherein the positive electrode comprises a current collector, and
    a positive active material layer arranged on the current collector, the positive active material layer comprises a binder, a conductive agent, and a positive active material essentially consisting of a lithium vanadium oxide-based compound represented by the following Chemical Formula 1:

$$Li_xV_{2-y}M_yO_5 \quad \text{[Chemical Formula 1]}$$

wherein M is at least one selected from the group consisting of aluminum (Al), magnesium (Mg), zirconium (Zr), titanium (Ti), strontium (Sr), copper (Cu), cobalt (Co), nickel (Ni), manganese (Mn), and a combination thereof, and
    wherein $3.5 \leq x < 4$ and y is $0 \leq y \leq 0.5$.

6. The rechargeable lithium battery of claim 5, wherein the lithium vanadium oxide-based compound is represented by the following Chemical Formula 3:

$$Li_{3.5}V_2O_5. \quad \text{[Chemical Formula 3]}$$

7. The positive electrode of claim 1, wherein the positive active material layer is composed of the binder, the conductive agent and the lithium vanadium oxide-based compound.

8. The positive electrode of claim 1, wherein the positive active material layer is produced by a process comprising:
    producing the lithium vanadium oxide-based compound by producing $Li_xV_2O_5$ by mixing together and heating $Li_2CO_3$ and $V_2O_5$ at 750 ° C. in a heat-resistant and chemical resistant crucible under an air atmosphere;
    producing a positive active material layer slurry by mixing together the $Li_xV_2O_5$ compound, the binder and the conductive agent; and
    forming the positive active material layer by applying the positive active material layer slurry to the current collector.

9. The positive electrode of claim 5, wherein the positive active material layer is composed of the binder, the conductive agent and the lithium vanadium oxide-based compound.

10. The positive electrode of claim 1, wherein the lithium vanadium oxide-based compound is included in an amount ranging from about 80 wt% to about 95 wt% based on a total weight of the positive active material layer, wherein the positive active material layer is composed of the lithium vanadium oxide-based compound, the binder and the conductive agent.

11. The rechargeable lithium battery of claim 5, wherein the lithium vanadium oxide-based compound is included in an amount ranging from about 80 wt% to about 95 wt% based on a total weight of the positive active material layer, wherein the positive active material layer is composed of the lithium vanadium oxide-based compound, the binder and the conductive agent.

12. The positive electrode of claim 8, wherein x is determined by a mol ratio of $Li_2CO_3$ to $V_2O_5$ used in the mixing and the heating.

13. The rechargeable lithium battery of claim 7, wherein the binder is at least one selected from the group consisting of polyvinylidene fluoride (PVDF), polyimide (PI), polyamide-imide (PAI), a polyimide-polyamideimide copolymer (PI-PAI), and a combination thereof.

14. The positive electrode of claim 1, wherein y is $0.02 < y \leq 0.5$.

15. The rechargeable lithium ion battery of claim 5, wherein y is $0.02 < y \leq 0.5$.

\* \* \* \* \*